(12) United States Patent
Rost et al.

(10) Patent No.: US 9,948,429 B2
(45) Date of Patent: Apr. 17, 2018

(54) HARQ IMPLEMENTATION FOR DISTRIBUTED BASE STATIONS

(71) Applicant: NEC EUROPE LTD., Heidelberg (DE)

(72) Inventors: Peter Rost, Heidelberg (DE); Athul Prasad, Helsinki (FI)

(73) Assignee: NEC CORPORATION, Tokyo (JP)

( * ) Notice: Subject to any disclaimer, the term of this patent is extended or adjusted under 35 U.S.C. 154(b) by 91 days.

(21) Appl. No.: 14/894,372

(22) PCT Filed: Jan. 22, 2014

(86) PCT No.: PCT/EP2014/051243
§ 371 (c)(1),
(2) Date: Nov. 27, 2015

(87) PCT Pub. No.: WO2015/120875
PCT Pub. Date: Aug. 20, 2015

(65) Prior Publication Data
US 2016/0119087 A1    Apr. 28, 2016

(51) Int. Cl.
*H04L 1/00* (2006.01)
*H04L 1/18* (2006.01)
*H04L 1/20* (2006.01)

(52) U.S. Cl.
CPC ............ *H04L 1/1812* (2013.01); *H04L 1/18* (2013.01); *H04L 1/203* (2013.01); *H04L 2001/0097* (2013.01)

(58) Field of Classification Search
None
See application file for complete search history.

(56) References Cited

U.S. PATENT DOCUMENTS 6,700,893 B1 * 3/2004 Radha ............... H04L 47/10
                                                  370/252
2008/0043619 A1 * 2/2008 Sammour ........... H04L 1/1685
                                                  370/231
(Continued)

FOREIGN PATENT DOCUMENTS

EP        2645611 A1    10/2013

OTHER PUBLICATIONS

Daewon Lee et al: "A Hybrid ARQ Scheme using Packet Error Prediction on OFDM based HSDPA Systems", 16th IST Mobile and Wireless Communications Summit, Jul. 1, 2007 (Jul. 1, 2007), pp. 1-5, XP031132441.
(Continued)

*Primary Examiner* — Chi H Pham
*Assistant Examiner* — Shick Hom
(74) *Attorney, Agent, or Firm* — Leydig, Voit & Mayer, Ltd.

(57) ABSTRACT

A method for operating a distributed base station includes performing Hybrid Automatic Repeat Request (HARQ) processing. The distributed base station comprises a centralized processing entity and distributed remote radio access points, which are coupled to the centralized processing entity via a backhaul connection. The HARQ processing is performed locally by the remote radio access points, by performing an assessment a quality of received data and/or current radio conditions. Based on the assessment, it is decided locally on a necessity of re-transmissions without decoding the received data at the remote radio access points.

19 Claims, 5 Drawing Sheets

(56) References Cited

U.S. PATENT DOCUMENTS

| | | | |
|---|---|---|---|
| 2008/0070581 A1* | 3/2008 | Charbit | H04L 1/0006 455/450 |
| 2009/0116551 A1* | 5/2009 | Nilsson | H04L 29/06 375/240.03 |
| 2010/0220608 A1* | 9/2010 | Skillermark | H04B 7/0417 370/252 |

OTHER PUBLICATIONS

Peter Rost, et al., "Opportunistic Hybrid ARQ—Enabler of Centralized-RAN over Non-Ideal Backhaul", Wireless Communications Letters, IEEE, vol. 3, issue 5, Jul. 29, 2014, p. 481-484.
3GPP TS 36.423 V12.0.0 (Dec. 2013), $3^{rd}$ Generation Partnership Project; Technical Specification Group Radio Access Network; Evolved Universal Terrestrial Radio Access Network (E-UTRAN); X2 application protocol (X2AP) (Release 12), Dec. 2013, pp. 1-144.

* cited by examiner

HARQ IMPLEMENTATION FOR DISTRIBUTED BASE STATIONS

CROSS-REFERENCE TO RELATED APPLICATIONS

This application is a U.S. National Phase application under 35 U.S.C. § 371 of International Patent Application No. PCT/EP2014/051243, filed on Jan. 22, 2014. The international application was published in English on Aug. 20, 2015, as WO 2015/120875 A1 under PCT Article 21(2).

FIELD

The present invention relates to a method for operating a distributed base station.

BACKGROUND

An overview about distributed base station architectures—also known as Cloud Radio Access Network or Centralized Radio Access Network (C-RAN) architectures—as addressed by the present invention is given in "C-RAN—The Road Towards Green RAN", China Mobile Research Institute, White Paper, Version 2.5, October 2011. Possible C-RAN architecture options currently being considered are as shown in FIGS. 1 and 2, generally referred to by reference numeral 1. Basically, in C-RAN architecture, a functional split is realized between distributed access points and a centralized access controller. More specifically, the access points, according to conventional prior art terminology also referred as radio function units or remote radio heads (RRH) 2, are separated from the access controller/base station 3, also referred as digital function unit or baseband unit (BBU), with a fiber link 4a, 4b between RRHs 2 and access controller/base station 3. The advent of centralized-RAN technology enables the potential to have distributed processing of data.

Currently considered architectures either assume an ideal backhaul 4a (FIG. 1) or near-ideal backhaul 4b (FIG. 2) with delays less than 3 ms in order to support the strict delay requirements for LTE-A (Long Term Evolution—Advanced) systems. Here in both cases, it is assumed that the entities above Layer 2 of the protocol stack (i.e. above the data link layer) would be present at the access controller which, as illustrated in FIGS. 1 and 2, is typically implemented in form of a cloud data center 5 hosting a pool of virtual base stations 3. Depending on the backhaul conditions, either fully or partially centralized RAN infrastructure could be deployed.

SUMMARY

In an embodiment, the present invention provides a method for operating a distributed base station, wherein the distributed base station comprises a centralized processing entity and a plurality of distributed remote radio access points, which are coupled to the centralized processing entity via a backhaul connection, the method comprising: performing Hybrid Automatic Repeat Request (HARQ) processing, locally by the remote radio access points, by the remote radio access points executing the steps of: performing an assessment of at least one of a quality of received data or current radio conditions, and based on the assessment, deciding locally on a necessity of re-transmissions without decoding the received data at the remote radio access points.

BRIEF DESCRIPTION OF DRAWINGS

There are several ways how to design and further develop the teaching of the present invention in an advantageous way. To this end it is to be referred to the dependent patent claims on the one hand and to the following explanation of preferred embodiments of the invention by way of example, illustrated by the drawing on the other hand. In connection with the explanation of the preferred embodiments of the invention by the aid of the drawing, generally preferred embodiments and further developments of the teaching will be explained. In the drawing

DETAILED DESCRIPTION

Figure 1:
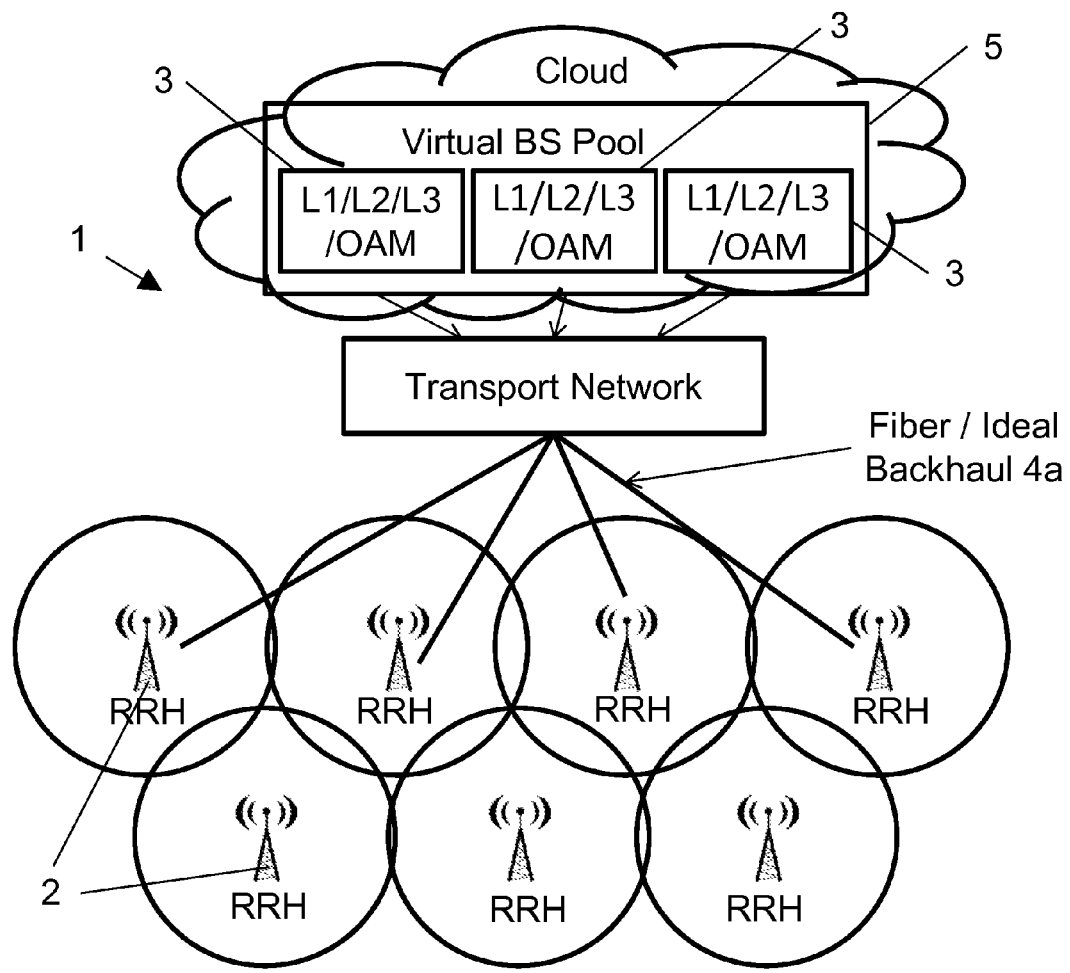
FIG. 1 is a schematic view illustrating a fully centralized C-RAN architecture with ideal backhaul.
Figure 2:
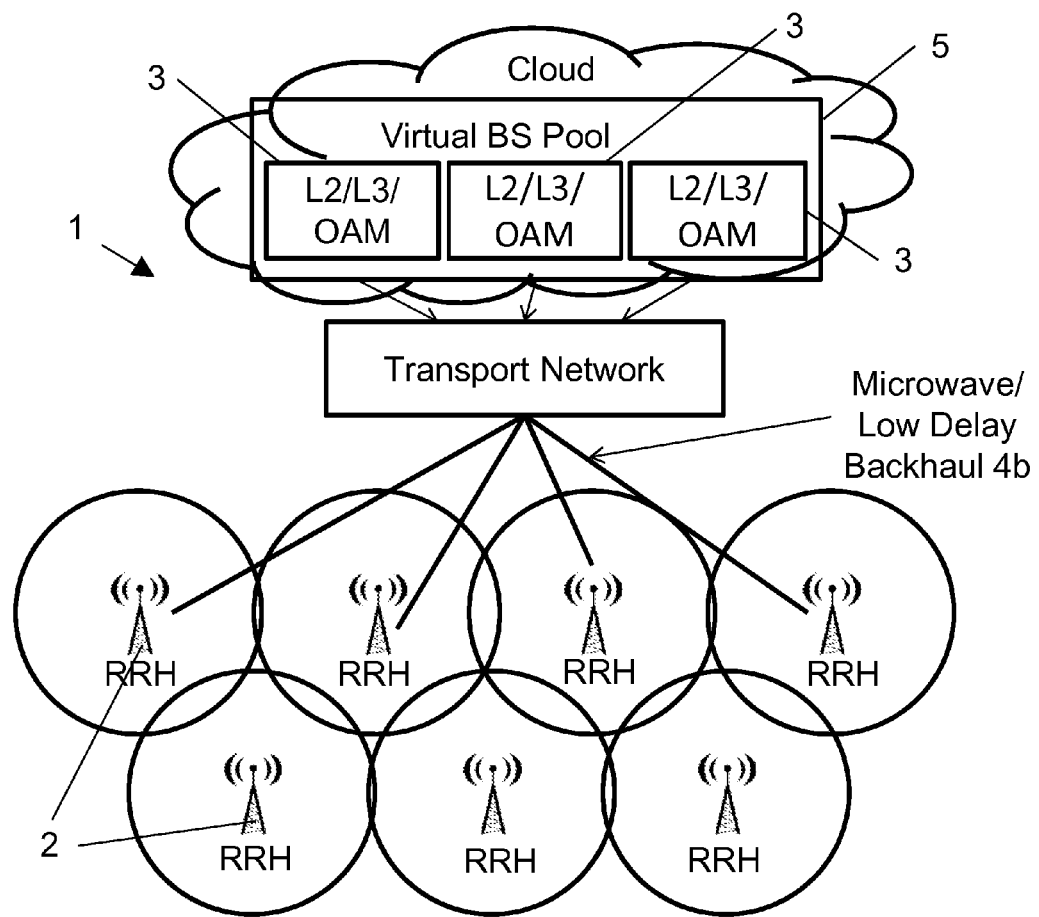
FIG. 2 is a schematic view illustrating a partially centralized C-RAN architecture with non-ideal backhaul.

The present invention relates to a method for operating a distributed base station, wherein said distributed base station comprises a centralized processing entity and a number of distributed remote radio access points, which are coupled to said centralized processing entity via a backhaul connection.

Furthermore, the present invention relates to a distributed base station, comprising a centralized processing entity, and a number of distributed remote radio access points, which are coupled to said centralized processing entity via a backhaul connection.

The main challenge for provisioning centralized radio access network using non-ideal backhaul having high latency or delay without moving Layer-1 processing to the RRH is HARQ (Hybrid Automatic Repeat Request). One of the main reasons for the strict delay requirements for the backhaul is for CQI (Channel Quality Indicator) feedback from the RRH to the centralized BS pool and providing feedback to the UE based on the response from the BS pool.

More specifically, as mentioned in section 4.1.2 of the above reference "HARQ is an important technology to improve the performance of the physical layer, its essence is testing the physical layer on the receiving end of a sub-frame for correct or incorrect transmission, and rapid feedback ACK/NACK to the launching end physical layer, then let launching physical layer to make the decision whether or not to send again. If sent again, the receiver does combined processing for multi-launching signal in the physical layer, and then provides feedback to the upper protocol after demodulation success. According to the LTE/LTE-A standard, the ACK/NACK HARQ on uplink and downlink process should be finished in 3 ms after receiving the signals in the shortest case, which requires a subframe processing delay in the physical layer should be generally less than 1 ms."

However, if Layer-1 processing is moved to RRH, this would mean deployment of dedicated hardware, leading to higher costs. Also, this invalidates the need for having a centralized radio access network infrastructure, since processing is still distributed, thereby making dynamic network deployment and service provisioning in an energy- and cost-efficient manner not possible.

In an embodiment, the present invention provides a method for operating a distributed base station and a distributed base station in such a way that, while using non-ideal backhaul, deployment of low complexity remote radio access points with centralized Layer-1 processing at the centralized processing entity is enabled, preferably without affecting the currently defined protocol stack for LTE-Advanced systems.

In an embodiment, the aforementioned object is accomplished by a method comprising the features of claim 1. According to this claim such a method is characterized in that said remote radio access points locally perform HARQ processing by executing the steps of performing an assessment of the quality of received data and/or performing an assessment of current radio conditions, and, based on said assessment, deciding locally on the necessity of re-transmissions without decoding received data at said remote radio access points.

Furthermore, in an embodiment, the present invention provides a distributed base station comprising the features of claim 18. According to this claim such a distributed base station is characterized in that said remote radio access points are configured to locally perform HARQ processing by executing the steps of performing an assessment of the quality of received data and/or performing an assessment of current radio conditions, and, based on said assessment, deciding locally on the necessity of re-transmissions without decoding received data at said remote radio access points.

In an embodiment, it has first been recognized that centralized-Radio Access Network (C-RAN) on layer-1 (L1) is not applicable to non-ideal backhaul. For instance, the maximum delay value for an interface conforming to CPRI (Common Public Radio Interface) standards would be 5 µs, which would be challenging to meet for low-cost interfaces, for e.g. using an air interface. Further, it has been recognized that one of the main impediments for this is the strict timing requirements for HARQ feedback. On the other hand, it has been recognized that centralization of HARQ could move major part of complexity (decoding and detecting) to the centralized processing entity/data center and significantly reduce the requirements on the remote radio access points. Therefore, an underlying idea of embodiments of the present invention is to centralize decoding of data, but distribute encoding, and to reduce at the same time the backhaul requirements of the network to enable provisioning of centralized RAN. According to the invention this is achieved by enabling the remote radio access points to make local decisions on the necessity/performance of re-transmissions on the basis of an assessment of the quality of received data, for instance by analyzing received data with the help of quality indicators. Alternatively or additionally, the remote radio access points may just perform a general assessment of the current radio conditions, from which the quality of received frames can be deduced. In any case, the assessments and the pertaining information acquisition is performed locally by the remote radio access points themselves, instead of relying on a decoding of received data. Based on the assessed quality of the received data, the remote radio access points can determine whether decoding of the data will be possible or not and, thus, they can decide locally on the necessity of re-transmissions.

As a result, the present invention enables deployment of low complexity remote radio access points with centralized Layer-1 processing at the virtual BS pool, using non-ideal backhaul having high latency/delay without affecting currently defined protocol stack for LTE-Advanced systems. In other words, the present invention enables deployment of centralized radio access networks fully compatible with legacy LTE UEs. Furthermore, it minimizes load on the backhaul between remote radio access points and centralized virtual BS pool.

In an embodiment of the distributed base station, the centralized processing entity may be composed of a number of radio access controllers or a number of so called baseband units, which are configured to carry out of the entire baseband processing. To this end the radio access controllers or baseband units may comprise the circuitry for the layers L1, L2 and L3 processing together with transport circuitry and means for communication with the EPC (Evolved Packet Core). To enable highest efficiency, it may be provided that the centralized processing entity is organized in form of a cloud data center hosting a pool of virtual base stations/radio access controllers/baseband units.

Advantageously, in order to keep the remote radio access points as lightweight as possible, the entire Layer 1 functionality and, apart from HARQ processing, Layer 2 functionality is moved to the centralized processing entity. In particular, the centralized processing entity may comprise a decoder for performing centrally decoding of received data.

In an embodiment, the assessment of current radio conditions may include the step of estimating a quality indicator for each received frame or sub-frame. Specifically, a local processor may determine the quality indicator as an estimation or probability whether or not a code block can be decoded.

In one embodiment the quality indicator may be determined by using a look-up table as follows: Based on average SINR (Signal Interference to Noise Ratio) or effective SINR, it is possible to map an effective SNR (Signal to Noise Ratio) to an effective frame error rate (FER) and to use this mapping as an estimation of the expected FER. The resulting mapping table may even be trained and updated through learning algorithms.

In this context it is worth noting that there is a similar mapping used in 3GPP RAN in order to perform link adaptation and select a suitable modulation and coding (for reference, see R. Sandanalakshmi, T. G. Palanivelu, K. Manivannan: "*Effective SNR Mapping for Link Error Prediction in OFDM Based Systems*", IET-UK International Conference on Information and Communication Technology in Electrical Sciences, December 2007 or R. Santos, W. C. Freitas, E. M. G. Stancanelli, F. R. P. Cavalcanti: "*Link-to-System level Interface Solutions in Multistate Channels for 3GPP LTE Wireless System*", Simposio Brasileiro de Telecomunicacoes, September 2007). A similar technique can be used according to an embodiment of the present invention to perform the estimation of the decoding probability. In this case the effective STNR may be built over all received frames.

In an alternative embodiment, the quality indicator may be determined by using predetermined theoretical upper and lower bounds on the error probability, in particular in case of flat radio channels. For instance, one could use the error probability introduced by R. Gallagher in R. Gallagher: "*Information Theory and Reliable Communication,*" $1^{st}$ ed. Wiley Press, 1968, in particular Section 7.5 on combining multiple frames. In this case, one could use an explicit equation in order to determine the error probability. Again, the effective SINR as before could be used and a learning algorithm for correct parameterization could be applied.

In both embodiments it may be provided that the remote radio access point, based on the quality indicator and a pre-defined (and configurable) threshold (hereinafter denoted QI threshold), estimates whether further information for HARQ is required and locally decides whether re-transmissions are performed.

In an embodiment, aiming at further optimization of the local decision process at the remote radio access point, for each received frame or subframe the remote radio access point may use different quantization degrees for estimating the quality indicator. In this regard it is important to note that using the same quantization for each HARQ round generally will yield suboptimal results. Currently in 3GPP LTE, HARQ can be adaptive or non-adaptive. Adaptive means that new transmission attributes such as MCS, transmission resource allocation, etc. are provided during the HARQ re-transmission. For the non-adaptive scheme, old attributes are reused with no further signaling. The instant invention can work with both alternatives since the HARQ decision making is done locally at the remote radio access points.

With respect to an efficient information exchange between the remote radio access points and the centralized processing entity, it may be provided that the remote radio access points combine a number of quality indicators for successive sub-frames and communicate such cumulated information towards the central processing entity. Such cumulated receive information may be transmitted towards the centralized processing entity either after detection (hard bits) or before detection (soft bits), or by using a combination of both.

In one embodiment, based on the cumulated information received from the remote radio access points, the central processing entity performs decoding and detection. In case of remaining frame errors, i.e. frame errors that have not been corrected by the remote radio access points in the framework of their locally executed HARQ processing, the central processing entity may rely on traditional ARQ for resolving these frame errors.

According to still another embodiment, further refinement is achieved by configuring the central processing entity to adapt the QI threshold for the quality indicators. The adaptation may be performed depending on current decoding experience and/or available computation resources in the cloud center, i.e. if there are more computational resources available less information is required from the remote radio access points and vice versa. Alternatively, the centralized processing entity could pass this information to the remote radio access points for fully distributed decision-making process as well.

Figure 3:
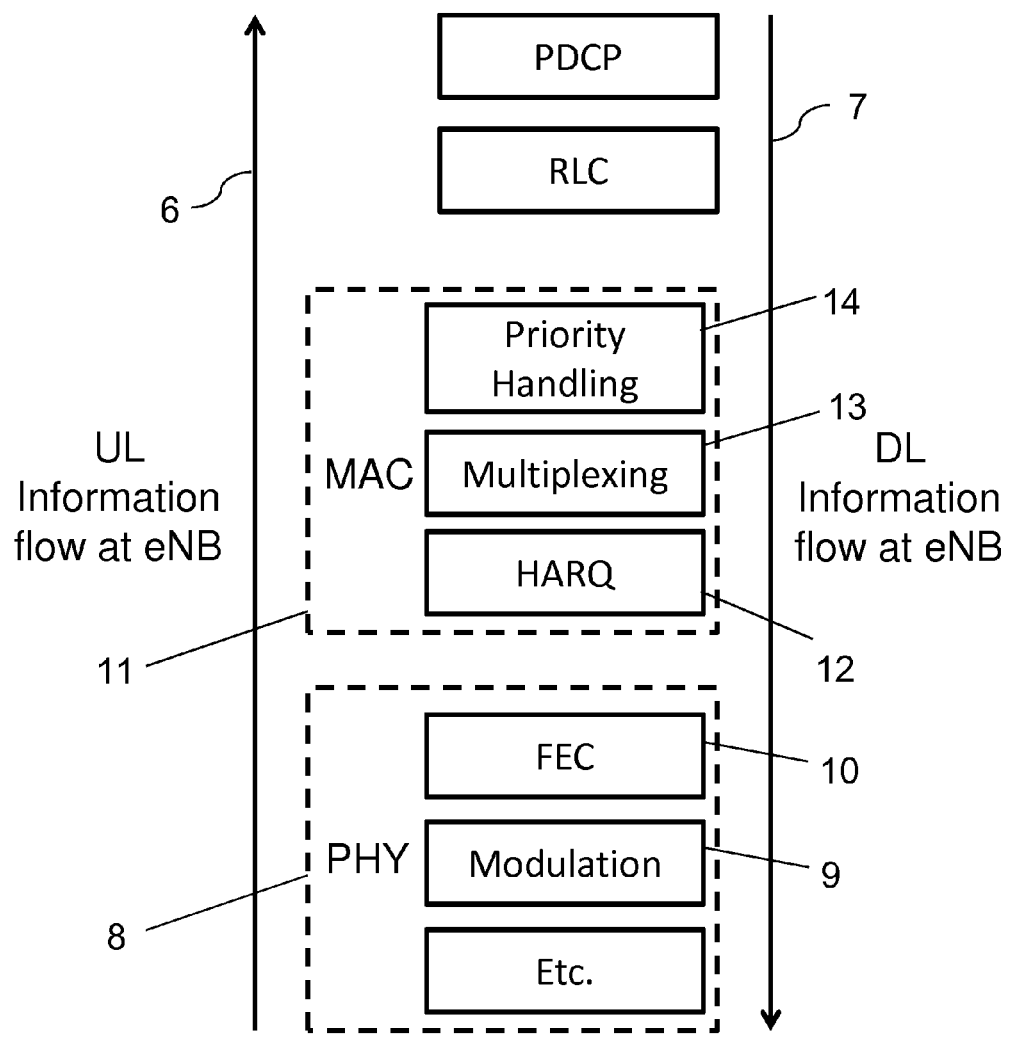
FIG. 3 is a diagram schematically illustrating the DL/UL information flow at eNodeB.

Before describing the exemplary embodiments of the instant invention, reference is made to FIG. 3 that illustrates the technical problem underlying this invention. FIG. 3 shows the usual downlink/uplink (DL/UL) information flow 6, 7 at a conventional eNodeB (base station). As can be obtained from FIG. 3, when frames are received at the eNodeB, e.g. from a mobile communication device which may be referred to as a UE (User Equipment), at first Layer 1 (i.e. physical layer PHY 8) processing is executed. In particular, Layer 1 processing includes—in DL—modulation 9 and Forward Error Correction (FEC) 10. It is noted that Layer 1 processing may include additional functionality which, however, is not directly related to the subject-matter of the present invention and the description of which is therefore omitted. Thereafter, Layer 2 (MAC layer 11) processing is executed, which in particular includes the HARQ process 12, multiplexing 13, and priority handling 14.

The present invention aims at keeping the HARQ process 12 within the remote radio access points, and to move the FEC 10 and modulation functionality 9 (DL) as well as the decoding and error detecting functionality (UL), not shown in FIG. 3, towards the central processor, e.g. C-RAN entity. The main problem is that HARQ 12 usually operates on top of FEC 10 and is triggered if the decoding was not successful. As will be explained in detail in connection with FIGS. 4 and 5, according to the present invention a solution is provided that enables to implement the HARQ process 12 locally and (de)coding as well as modulation/detection centrally for both DL and UL, and to also move the rest of the functionality in Layer 2 to the centralized cloud data center or base station pool.

Figure 4:
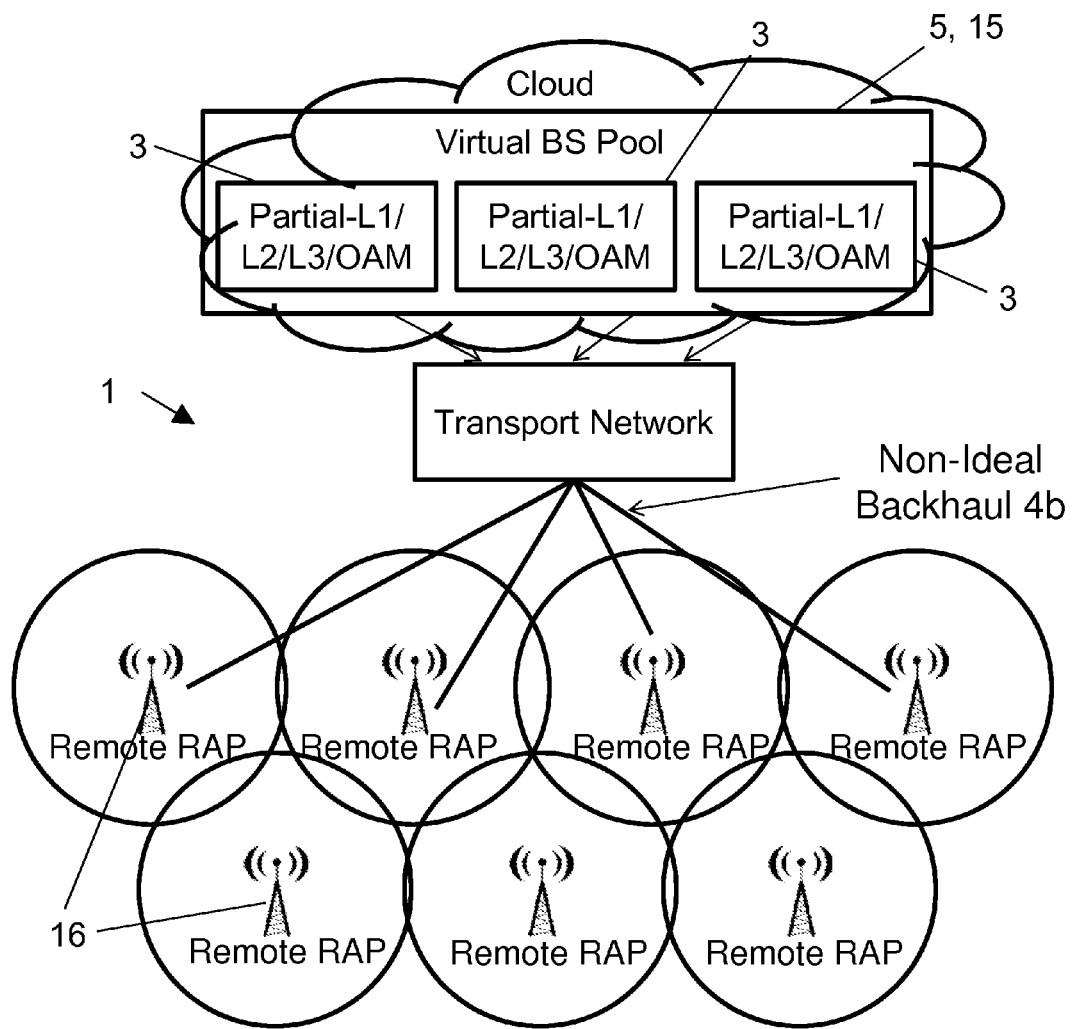
FIG. 4 is a schematic view illustrating a partially centralized C-RAN architecture in accordance with an embodiment of the invention.

Referring now to FIG. 4, this figure shows a distributed base station or C-RAN architecture, generally denoted with reference numeral 1, according to an embodiment of the present invention. Specifically, FIG. 4 depicts a centralized processing entity 15, implemented e.g. in form of a cloud data center 5, hosting a pool of virtual base stations 3. A number of remote radio access points, hereinafter briefly denoted remote RAPs 16 (Radio Access Points), separated both locally and functionally from the centralized processing entity 15 is connected thereto via non-ideal backhaul 4b.

According to the instant invention, RAPs 16 locally perform HARQ processing by assessing the current radio conditions, and, based on said assessment, deciding locally on the performance of re-transmissions without decoding received data. This may be achieved with the help of quality indicators, hereinafter briefly denoted QI, which may be estimated by a local processor, in particular on the basis of the quality of received signals. This estimation of "information content" may be used to estimate whether or not a code block can be decoded.

Various algorithms for determining the QIs may be employed. For instance, based on average SINR or effective SINR, it is possible to map an effective SNR (e.g. normalized through mutual information) to an effective frame error rate (FER) and to use this mapping as an estimation of the expected FER. The resulting mapping table may be trained and updated through learning algorithms. Alternatively, it is possible to use pre-determined theoretical upper and lower bounds on the error probability, which is particularly beneficial in the case of flat channels.

The QIs could be using already defined and standardized ones, or newly defined ones. The RAPs 16 may compute the QIs in a distributed manner, for instance by using adaptive learning algorithms or using feedback from centralized processing entity 15 based on feedback from multiple RAPs 16 in the network. In this regard, the key information that the pool of virtual BS 3 in the cloud data center 5 should provide RAPs 16 are the parameters required for RAPs 16 to make the HARQ retransmission decisions independently, without decoding the received data. The RAPs 16 could compute this information by reusing existing algorithms for radio parameter optimizations as well. For this, CQI (Channel Quality Indicator) could be one of the parameters. However, as will be easily appreciated by those skilled in the art, further parameters can be envisioned, such as based on signal quality estimates, block length and used code (Modulation and Coding Scheme, MCS).

Turning now to the processing in the DL, it is first noted that the DL is less relevant than the UL because re-encoding is of subordinate significance compared to decoding as in the UL. With respect to the processing in the DL, it may be provided that based on long-term QI, e.g. RSRP (Reference Signal Receive Power), SINR, or the like, the centralized processing entity 15 provides copies of the information to be transferred in order to prepare the RAPs 16 for possible re-transmissions. Based on the backhaul capacity, the central processing entity 15 can further optimize the amount of overhead by pro-actively providing the data. Moreover, the centralized processing entity 15 may optimize the amount of overhead based on buffer status at RAPs 16 in order to avoid buffer overflows at the RAPs 16.

Figure 5:
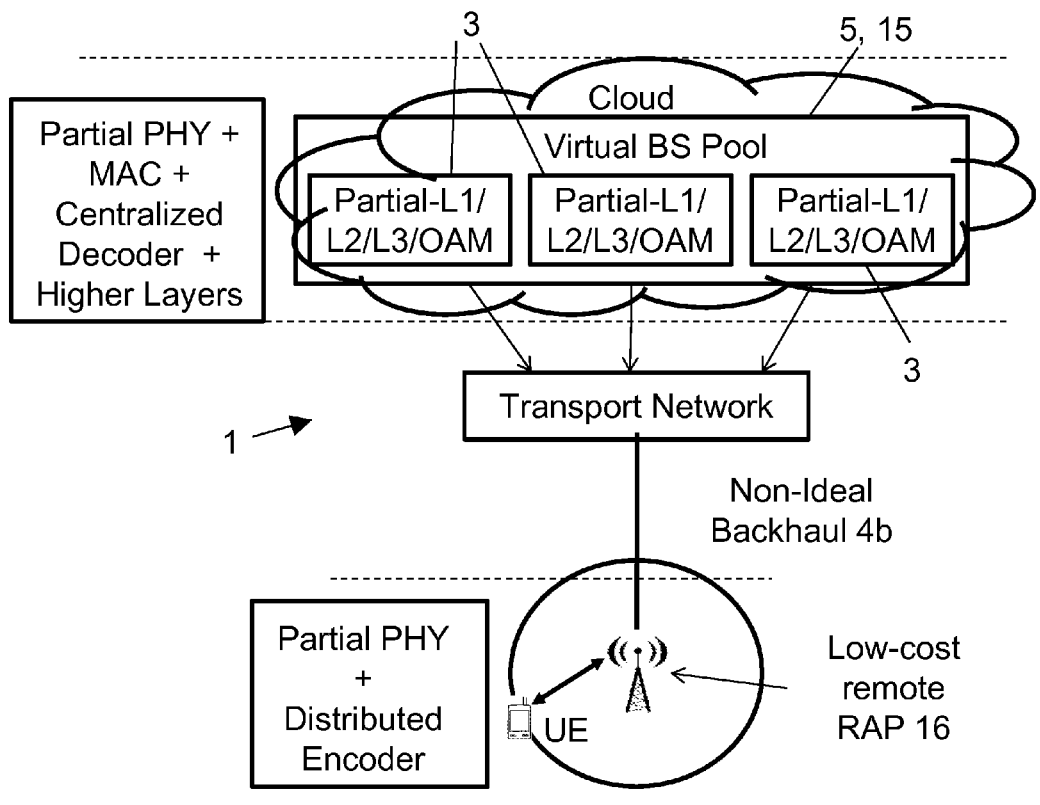
FIG. 5 is a schematic view illustrating a partially centralized C-RAN architecture with centralized decoder and distributed encoder in accordance with an embodiment of the invention.

Basically, FIG. 5 shows the same embodiment of the present invention as FIG. 4, and the same numerals denote the same components as in FIG. 4. However, for the sake of simplicity only a single RAPs 16 is exemplarily depicted in FIG. 5, while highlighting the functional split realized between cloud data center 5 or centralized processing entity 15, respectively, on the one hand and the RAPs 16 on the other hand. While in accordance with the present invention HARQ processing is kept within the RAPs 16, the FEC and modulation functionality (DL) and the decoding and error detecting functionality (UL) is moved towards the centralized processing entity 15. Although HARQ usually operates on top of FEC and is triggered if the decoding was not successful, by enabling RAPs 16 to assess the radio conditions, for instance with the help of quality indicators, the RAPs 16 are empowered to acquire information required for a fully distributed HARQ decision making process. Thus, in accordance with embodiments of the present invention it is possible to implement HARQ process locally, with centralized decoder and distributed encoders, and also move the rest of the functionality in Layer 2 (and Operation, Administration & Maintenance, OAM) to the centralized cloud data center 5 or base station pool.

The signaling between centralized processing entity 15 and RAPs 16 is assumed to be similar to currently defined information element format for 3GPP LTE-A systems. As will be appreciated by those skilled in the art, it will be possible to use completely new interfaces and formats. In particular, the signaling defined for standardized interfaces such as X2 (3GPP TS 36.423, "E-UTRAN: X2 Application Protocol") may be reused, or CPRI (Common Public Radio Interface) interface messages (CPRI Specification v6.0, "Common Public Radio Interface (CPRI); Interface Specification") with minor modifications may be employed. Possible embodiments are shown in the following table:

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is

| IE/Group Name | Presence | Range | IE type and reference | Semantics description | Criticality | Assigned Criticality |
|---|---|---|---|---|---|---|
| HARQ Triggering Threshold per PRB | M | | BIT STRING (6 . . . 110, . . .) | Each position in the bitmap represents a $n_{PRB}$ value (i.e. first bit = PRB 0 and so on), for which the bit value represents HARQ ($n_{PRB}$) Value 0 indicates "Tx not exceeding RNTP threshold". Value 1 indicates "no promise on the Tx power is given". | — | — |
| HARQ Triggering Threshold | M | | ENUMERATED (−∞, −11, −10, −9, −8, −7, −6, −5, −4, −3, −2, −1, 0, 1, 2, 3, . . .) | | — | — |

The signaling interface could also be a proprietary one conforming to standards defined in CPRI Specification v6.0, "Common Public Radio Interface (CPRI); Interface Specification". Currently, the delay requirements are stringent mainly to adapt to standards defined for HARQ. With the instant invention, it is envisioned that the delay requirements would be relaxed, by empowering the RRHs with more decision-making capabilities.

intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for operating a distributed base station, wherein the distributed base station comprises a centralized processing entity and a plurality of distributed remote radio access points located remotely from but coupled to the centralized processing entity via a backhaul connection, the method comprising:
performing, locally by each remote radio access point, automatic repeat request (ARQ) processing by executing, at each respective remote radio access point, the steps of:
performing an assessment of at least one of a quality of received data or current radio conditions, and
deciding, based on the assessment and without performing physical layer processing of the received data, whether to trigger re-transmissions of the received data.

2. The method according to claim 1, wherein Layer 1 functionality and, apart from the ARQ processing, Layer 2 functionality is executed by the centralized processing entity.

3. The method according to claim 1, further comprising decoding the received data centrally by the centralized processing entity.

4. The method according to claim 1, wherein the performing the assessment of at least one of a quality of received data or current radio conditions includes performing the assessment of the current radio conditions and further includes estimating a quality indicator for each frame or sub-frame of the received data.

5. The method according to claim 4, wherein the quality indicator is estimated by mapping an experienced signal to interference noise ratio to an effective Frame Error Rate (FER) and by using the mapping as an estimation of an expected FER.

6. The method according to claim 5, wherein the mapping is at least one of trained or updated through learning algorithms.

7. The method according to claim 4, wherein the quality indicator is estimated by using predetermined theoretical upper and lower bounds on an error probability.

8. The method according to claim 4, wherein deciding locally whether to trigger re-transmissions is based on the quality indicators and a configurable threshold for the quality indicators.

9. The method according to claim 4, wherein different quantization degrees are used for estimating the quality indicator for each of the frames or sub-frames of the received data.

10. The method according to claim 4, wherein the remote radio access points combine a plurality of the quality indicators for successive ones of the sub-frames so as to provide cumulated information and communicate the cumulated information towards the centralized processing entity.

11. The method according to claim 1, wherein the centralized processing entity performs decoding and detection based on cumulated information received from the remote radio access points.

12. The method according to claim 1, wherein the centralized processing entity relies on the ARQ processing for resolving frame errors.

13. The method according to claim 4, wherein the central processing entity adapts a threshold for the quality indicators depending on at least one of a current decoding experience or available computation resources.

14. A distributed base station, comprising:
a centralized processing entity; and
a plurality of distributed remote radio access points, which are located remotely from but coupled to the centralized processing entity via a backhaul connection, each of the plurality of distributed remote radio access points being configured to locally perform Automatic Repeat Request (ARQ) processing by:
performing an assessment of at least one of a quality of received data or current radio conditions, and
deciding locally, based on the assessment and without performing physical layer processing of the received data, whether to trigger re-transmissions of the received data.

15. The distributed base station according to claim 14, wherein the centralized processing entity comprises at least one of a plurality of radio access controllers or a plurality of baseband units.

16. The distributed base station according to claim 14, wherein the centralized processing entity is organized as a cloud data center hosting a pool of virtual base stations.

17. The distributed base station according to claim 14, wherein the centralized processing entity is configured to execute Layer 1 functionality and, apart from the ARQ processing, Layer 2 functionality.

18. The distributed base station according to claim 14, wherein the centralized processing entity comprises a decoder that is configured to centrally decode the received data.

19. A distributed base station, comprising:
a centralized processing entity; and
a plurality of distributed remote radio access points, which are coupled to the centralized processing entity via a backhaul connection, wherein the remote radio access points are configured to locally perform Automatic Repeat Request (ARQ) processing by:
performing an assessment of at least one of a quality of received data or current radio conditions, and
based on the assessment, deciding locally at the remote radio access points on a necessity of re-transmissions without performing physical layer processing of the received data;
wherein the centralized processing entity comprises at feast one of a plurality of radio access controllers or a plurality of baseband units.

* * * * *